Dec. 19, 1950  C. K. JUDD, JR  2,534,775
GLASS CUTTING BOARD
Filed June 16, 1948  2 Sheets-Sheet 1
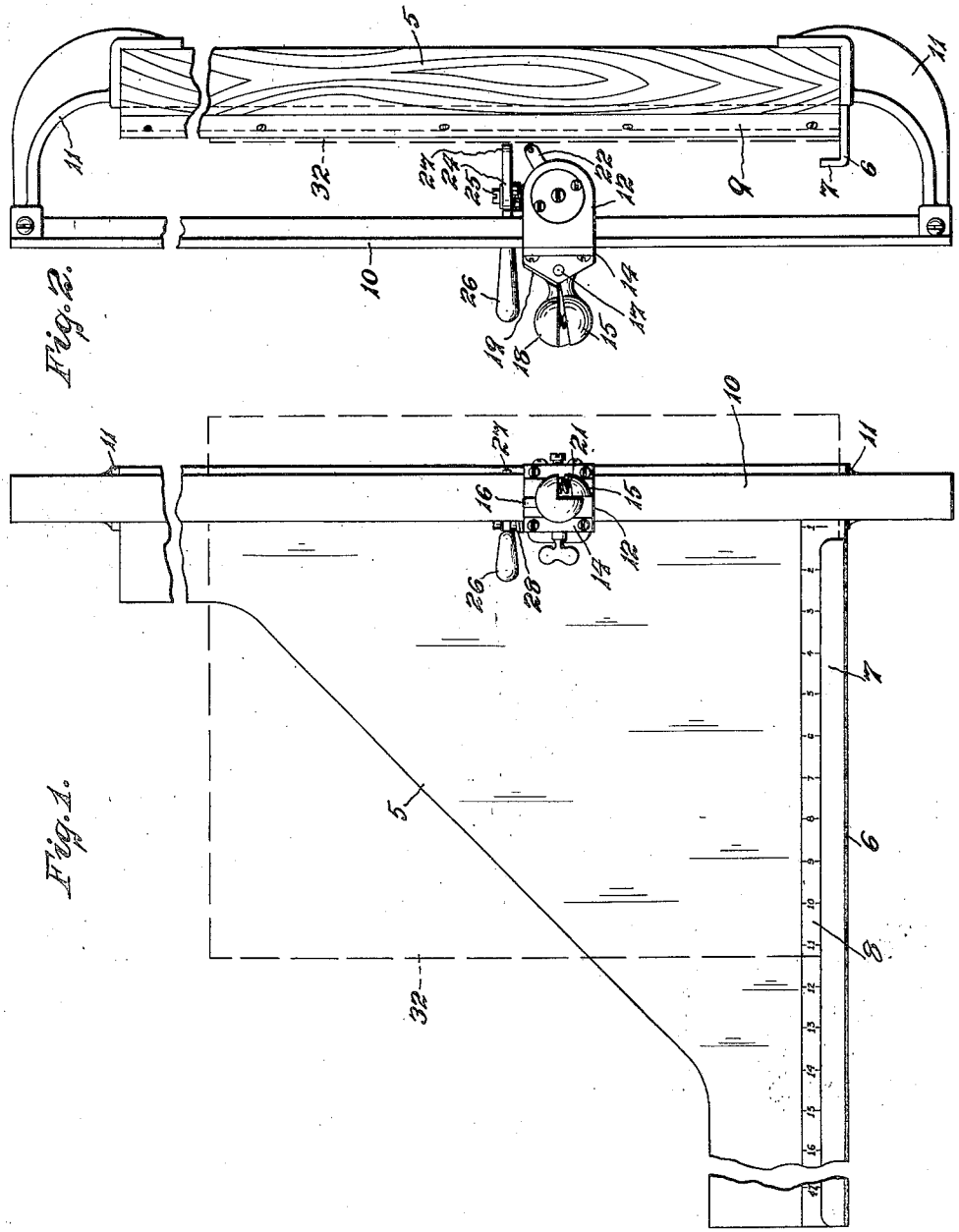
INVENTOR.
CHESTER K. JUDD JR.
BY
Louis V. Lucia
ATTORNEY.

Dec. 19, 1950  C. K. JUDD, JR  2,534,775
GLASS CUTTING BOARD
Filed June 16, 1948  2 Sheets-Sheet 2
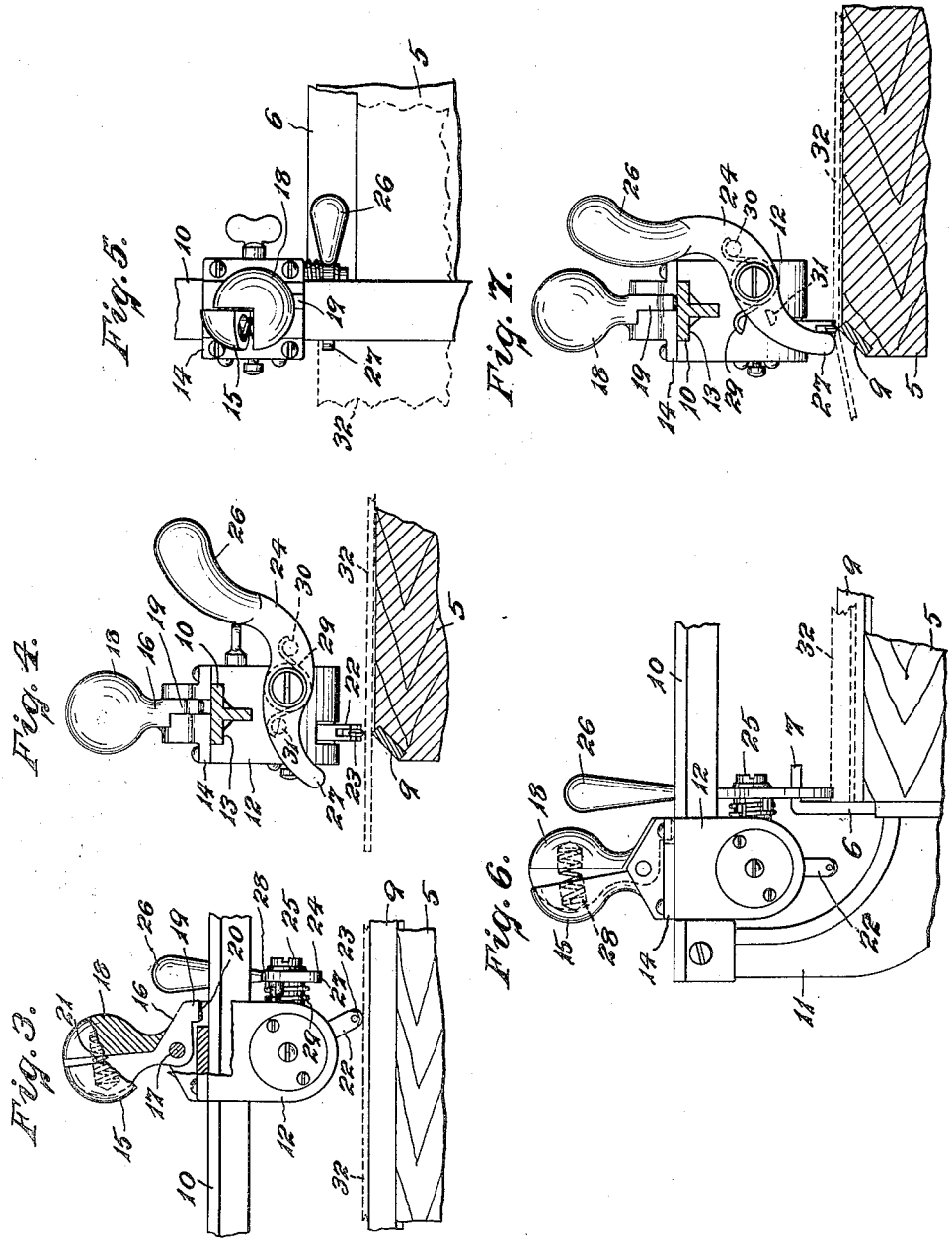
INVENTOR.
CHESTER K. JUDD JR.
BY
Louis V. Lucia
ATTORNEY.

Patented Dec. 19, 1950

2,534,775

UNITED STATES PATENT OFFICE 2,534,775

GLASS CUTTING BOARD

Chester K. Judd, Jr., Bristol, Conn., assignor to The Fletcher-Terry Company, Forestville, Conn., a corporation of Connecticut Application June 16, 1948, Serial No. 33,350

5 Claims. (Cl. 49—48)

This invention relates to a glass cutting board and more particularly to a device which is especially adapted for use in cutting sheets of glass.

An object of this invention is to provide a glass cutting board which is efficient in its operation, easy to use, and which will cut sheets of glass accurately and squarely.

A further object of this invention is to provide such a board having means for measuring the glass sheets so that they may be cut to different sizes quickly and easily, even by inexperienced operators.

A still further object of the invention is to provide such a board having a cutter device which is highly efficient in its operation and which is provided with means for breaking off that portion of a glass sheet which is cut off.

Further objects and advantages of this invention will be more clearly understood from the following description and from the accompanying drawings in which:

Fig. 1 is a plan view of a glass cutting board embodying my invention.

Fig. 2 is a side view thereof.

Fig. 3 is a side view of the glass cutter device and of the breaker of my improved cutting board.

Fig. 4 is a rear view thereof.

Fig. 5 is a plan view thereof.

Fig. 6 is a side view of said cutter device in position for the operation of the breaker.

Fig. 7 is a rear view illustrating the operation of said breaker.

In the embodiment of my invention illustrated in the drawings, the numeral 5 denotes a board which is preferably constructed of wood and triangular in shape, as illustrated in Fig. 1, to facilitate the handling of sheets of glass thereon and also to eliminate unnecessary material.

The said board is provided with supporting means in the form of a shelf 6 which is secured in a suitable manner to the lower edge of the said board and has a lip 7 that provides a channel running along the said edge. A suitable scale 8 is also provided along the said edge of the board for measuring the glass which is to be cut.

The board 5 is also provided with a breaker strip 9, preferably in the form of a metal bar, running along the side edge of the board and disposed at an angle thereto and mounted so that a corner of the said bar will project slightly above the surface of the board as clearly shown in Fig. 4.

A track 10, preferably constructed of a cross-sectionally T-shaped bar, is mounted above and along the said side edge of the board by means of suitable brackets 11—11 which are fastened to the upper and lower edges of the board.

A suitable glass cutting device is slidably mounted on the track 10 and preferably comprises a body 12 having a groove 13 in the top thereof adapted to receive the track bar 10, and a cap 14 which is secured to said body over the track to slidably retain the said cutting device thereon.

The said cutting device is provided with a handle which includes a portion 15 that extends upwardly from the cap 14 and which may be grasped for sliding the cutter along the track 10.

As shown, the cutting device also includes a brake mechanism comprising a lever 16 which is pivoted at 17, on the cap 14, and has a handle portion 18 which is cut away as shown to receive the handle portion 15 therein and thereby provides a ball shaped handle for the said cutting device. The lever 16 has a portion 19 extending therefrom with a suitable friction pad 20 thereon that is adapted to be forced into engagement with the top surface of the track bar 10 by means of a spring 21 that is positioned between the handle portions 15 and 18.

The said cutter device has mounted thereon an arm 22 which carries a glass cutting wheel 23 of conventional form. This arm is preferably pivoted in the body 12, in a suitable manner which is not shown, and may be provided with spring means for yieldingly urging the cutter into engagement with the glass sheet that is being cut thereby.

Details of the mechanism of the said cutting device are not described herein as it is intended that various types of suitable cutters and mechanisms may be used in combination with my improved cutting board and such devices do not constitute a part of my present invention.

It will be noted that the glass cutter wheel 23 is positioned directly above and in line with the corner of the breaker strip 9 which projects above the surface of the board 5 so that, when a line of cut is made by the cutting wheel 23 in the surface of the glass sheet, the said line will be directly above the corner of the breaker strip and the cut off portion of the glass sheet may thereby be readily broken off from the main portion.

The present invention further provides, in combination with the said cutting board, a mechanism for breaking off the piece of the glass sheet which is cut off. This mechanism includes a breaker lever 24 which is pivotedly mounted at 25 on the body 12 of the cutting device. This lever 24 has a handle portion 26 projecting upwardly therefrom and a breaking portion 27 which extends to a position outside of the corner of the breaker strip 9, as clearly illustrated in Fig. 7. The said breaker lever 24 is preferably provided with a suitable spring 28 which is anchored on a stud 29, projecting from the body 12, and is secured to a stud 30 on the breaker lever for normally retaining the portion 27 of the said lever in a lifted position, wherein the stop stud 31 on said portion will engage the stud 29 and thereby retain the portion 27 in the lifted position, as illustrated in Fig. 5, during the glass cutting operation.

In the use and operation of my improved glass cutting board, the handle 15 of the cutting device is first grasped with the hand and the portion 18 of the breaker lever is then squeezed towards the said handle in order to lift the friction pad 20 out of engagement with the surface of the track bar 10. The said cutting device is then slid upwardly to the upper end of the track and the portion 18 is released to permit the friction pad 20 to engage the track and hold the cutting device in that position. A sheet of glass, indicated at 32, which is to be cut to a certain size, is then placed on the shelf 6 and the right side of said sheet is moved over the corner of the strip 9 until the left edge thereof is in line with the graduation on the scale 8 indicating the size for which the sheet is to be cut. The said cutting device is then slid downwardly, on said track, whereupon the cutter wheel will be forced, by the spring tension in the device, against the surface of the glass sheet and thereby form a line of cut, or score line, directly above the supporting corner of the strip 9, as clearly shown in Fig. 4.

After the said score line has been completed, the cutting device will have come to rest at the lower end of the track 10, in which position the cutter wheel will be below the lower edge of the glass sheet while the breaker bar 24 will still be overlying the lower portion of said sheet. The said breaker bar may then be rocked against the tension of the spring 28 so that the end portion 27 thereof will engage the piece of glass sheet which is to be cut off and force the said piece downwardly to thereby break it off along the line of cut.

The provision of the breaker bar 24 constitutes an important element of my invention since it permits the separation of the glass on the line of cut immediately after said line has been completed and while it is still under tension, and thereby assures a much cleaner cut than would otherwise be possible.

The said breaker bar further permits the breaking of the glass on the line of cut, without risk to the hands, and allows the operator to use one hand for operating the cutter and breaker, and the other hand for holding the glass sheet in position during the cutting operation.

While the construction illustrated provides a board which may be used in a flat position on a supporting surface, it is intended that the said board may also be used in an inclined position so that the glass sheet may be readily placed upon the flat surface thereof and supported upon the bottom of the groove in the shelf 6, with no other means being required to secure the sheet upon the said surface.

I claim:

1. A glass cutting board of the character described comprising a board having a supporting surface, means along the lower edge of said board for supporting a sheet of glass resting on said surface, a track spaced from and running along an edge of said board perpendicular to the lower edge thereof, a cutting device slidable on said track, a cutter carried by said cutting device along the said perpendicular edge of the said board, and a breaker member pivotally carried on said cutting device and having a portion reaching beyond the said perpendicular edge of the board for breaking off a piece of glass on a line with said perpendicular edge.

2. A glass cutting board of the character described comprising a supporting surface, means running along the bottom of said board for supporting a sheet resting on said surface, a metallic strip secured along an edge of said board perpendicular to the lower edge thereof and angularly positioned so that a corner thereof projects slightly above the said supporting surface to provide a breaker edge, a track mounted on the board parallel to and disposed above said breaker edge, a cutting device slidable on said track, a cutter wheel carried by said cutting device along the said breaker edge, and a breaker lever pivoted on said cutting device and having a portion thereof projecting beyond the said breaker edge to engage and break a piece of glass on a line of cut made by said wheel along the said breaker edge.

3. A glass cutting board of the character described having a supporting surface, means running along the lower edge of said board for supporting a sheet of glass resting on said surface, a track spaced from and parallel to an edge of said board perpendicular to the said lower edge thereof, a cutting device slidable on said track, a cutter wheel carried by said device along the said perpendicular edge, stop means for limiting the movement of and positioning said cutting device to locate said cutter in a position off of said board, and a breaker lever pivoted to said cutting device and having a portion spaced from said cutter wheel and adapted, when the said wheel is off of the board, to engage and break off a piece of glass cut on a line with said perpendicular edge.

4. A glass cutting board of the character described having a flat surface, means running along the lower edge of said board for supporting a sheet of glass resting upon said surface, a track spaced from and parallel to an edge of said board perpendicular to said lower edge, a cutting device slidable on said track, a cutter wheel carried by said cutting device along the said perpendicular edge and adapted to engage a sheet of glass resting on said surface and form a line of cut therein along said perpendicular edge, a breaker lever pivotally carried on said cutting device and having a portion projecting therefrom beyond the said perpendicular edge and spaced from said cutter wheel, the said track extending below the said lower edge of the board and above the upper edge thereof to permit the said cutter wheel to be moved across the entire length of the said perpendicular edge, and stop means at the lower end of the said track adapted to stop the said cutting device and locate the said breaker lever in position to engage a piece of glass being cut off of said sheet and break off the said piece therefrom on a line of cut made by said cutter along said perpendicular edge.

5. A glass cutting board having a flat supporting surface, means running along the lower edge of said board for supporting a sheet of glass resting against said surface, a track spaced from and running parallel to an edge of said board perpendicular to said lower edge, a cutting device including a body portion slidable on said track, a cutter carried on said body portion for cutting a sheet of glass on a line with said edge, and a breaker lever pivotally mounted upon said body portion on a plane below said track; the said lever having a portion extending from the body portion beyond said perpendicular edge for engaging a portion of a glass sheet to be broken off on the line of cut, and a handle portion on said breaker lever projecting upwardly from said body portion to a plane above said track, and spring means yieldingly urging said lever into normal position wherein the said projecting breaking portion is retained in raised position relatively to said supporting surface.

CHESTER K. JUDD, Jr.

REFERENCES CITED

The following references are of record in the file of this patent:

UNITED STATES PATENTS

| Number | Name | Date |
|---|---|---|
| 453,867 | Monce | June 9, 1891 |
| 1,117,736 | Whittemore | Nov. 17, 1914 |
| 1,972,210 | Waldron | Sept. 4, 1934 |
| 2,174,183 | Shaw | Sept. 26, 1939 |
| 2,254,541 | Nordgren | Sept. 2, 1941 |

FOREIGN PATENTS

| Number | Country | Date |
|---|---|---|
| 108,164 | France | May 24, 1875 |